US011002019B1

(12) United States Patent
Mendoza (10) Patent No.: US 11,002,019 B1
(45) Date of Patent: May 11, 2021

(54) PREASSEMBLED STRUCTURAL IMPACT PANEL (71) Applicant: M-Tech Construction Technologies Inc., Doral, FL (US)

(72) Inventor: Alex Mendoza, Doral, FL (US)

(*) Notice: Subject to any disclaimer, the term of this patent is extended or adjusted under 35 U.S.C. 154(b) by 0 days.

(21) Appl. No.: 16/590,575

(22) Filed: Oct. 2, 2019

Related U.S. Application Data (63) Continuation-in-part of application No. 15/987,691, filed on May 23, 2018, now abandoned.

(51) Int. Cl.
*E04F 13/08* (2006.01)
*E04F 13/14* (2006.01)
*E04F 13/18* (2006.01)
*B32B 18/00* (2006.01)
*F41H 5/24* (2006.01)
*F41H 5/04* (2006.01)

(52) U.S. Cl.
CPC .......... *E04F 13/0866* (2013.01); *B32B 18/00* (2013.01); *E04F 13/142* (2013.01); *E04F 13/18* (2013.01); *F41H 5/0414* (2013.01); *F41H 5/24* (2013.01); *B32B 2250/03* (2013.01); *B32B 2250/40* (2013.01); *B32B 2260/02* (2013.01); *B32B 2260/046* (2013.01); *B32B 2307/558* (2013.01); *B32B 2607/00* (2013.01); *E04F 2290/04* (2013.01)

(58) Field of Classification Search
CPC ... E04F 13/075; E04F 13/077; E04F 13/0866; E04F 13/142; B32B 9/005; B32B 2419/04
See application file for complete search history.

(56) References Cited

U.S. PATENT DOCUMENTS

| 3,852,148 | A | * | 12/1974 | Pryor | ...................... A47J 36/02 428/433 |
| 5,666,772 | A | * | 9/1997 | Betty | ...................... E04D 11/00 52/177 |
| 5,713,166 | A | * | 2/1998 | Couture | .................. B29C 65/54 52/191 |
| 5,849,406 | A | * | 12/1998 | Daws | ........................ B28B 1/50 428/312.2 |
| 8,484,931 | B2 | | 7/2013 | Gleeson et al. | |
| 2003/0014998 | A1 | * | 1/2003 | Cabo | ..................... C03B 23/203 65/43 |

(Continued)

FOREIGN PATENT DOCUMENTS

| DE | 102012025028 A1 * | 6/2014 | ............ B32B 9/041 |
| EP | 0340607 A1 * | 11/1989 | ............ E04F 13/081 |

(Continued)

*Primary Examiner* — Christine T Cajilig
(74) *Attorney, Agent, or Firm* — Sanchelima & Associates, P.A.; Christian Sanchelima; Alexander Rodriguez (57) ABSTRACT

An impact resistant panel used to replace spandrel glass panels or aluminum panels in structures that uses an impact resistant interlayer to fuse two porcelain layers together. The panel of the present invention is a three-layered panel formed by fusing a first rolled porcelain layer, an impact resistant interlayer and a second rolled porcelain layer. The impact resistant interlayer is melted into the pores of the porcelain layers to create an integral porcelain panel that can be used as structural elements or small, medium, and large dimensions while having impact resistant qualities.

10 Claims, 8 Drawing Sheets

(56) References Cited

U.S. PATENT DOCUMENTS

| | | | | |
|---|---|---|---|---|
| 2004/0234730 | A1* | 11/2004 | Rinehart | B32B 17/10036 |
| | | | | 428/192 |
| 2006/0032166 | A1* | 2/2006 | Devalapura | B32B 3/10 |
| | | | | 52/309.15 |
| 2006/0048640 | A1* | 3/2006 | Terry | F41H 5/0414 |
| | | | | 89/36.02 |
| 2006/0115651 | A1* | 6/2006 | Merfeld | B32B 17/10036 |
| | | | | 428/410 |
| 2007/0092713 | A1* | 4/2007 | Trudeau | B32B 27/08 |
| | | | | 428/304.4 |
| 2010/0018133 | A1* | 1/2010 | Boyadjian | E04F 15/08 |
| | | | | 52/144 |
| 2014/0349084 | A1* | 11/2014 | Patki | E04B 1/82 |
| | | | | 428/189 |
| 2019/0316362 | A1* | 10/2019 | Maccari | E04F 13/142 |

FOREIGN PATENT DOCUMENTS

| | | | | | |
|---|---|---|---|---|---|
| EP | 3561193 | A1 | * | 10/2019 | C04B 33/20 |
| FR | 728134 | A | * | 6/1932 | E04B 9/04 |

* cited by examiner

PREASSEMBLED STRUCTURAL IMPACT PANEL

OTHER RELATED APPLICATIONS

The present application is a continuation-in-part of pending U.S. patent application Ser. No. 15/987,691, filed on May 23, 2018, which is hereby incorporated by reference.

BACKGROUND OF THE INVENTION

1. Field of the Invention

The present disclosure relates to a preassembled structural panel for forming an architectural structure. More particularly, the present disclosure relates to a preassembled structural panel that provides high wind resistance, impact resistance and insulation to an architectural structure and is aesthetic appealing at a low cost.

2. Description of the Related Art

Architectural structures, like a building unit, houses, apartments or skyscrapers, require panels to withstand high wind pressure and insulate the interior of the building from the external environment. Further, those same architectural structures also need panels having high impact resistance. This can be especially beneficial in areas where hurricanes, tornadoes or other natural weather elements can be hazardous. In many conventional architectural structures, for aesthetic appeal, glass is used, however, such glass, because of its brittle property, is susceptible to breakage or damage. Hence, there is a need for a panel that provides resistance to high wind and/or impact, insulation from environmental elements, is aesthetically appealing at a low cost and durable. Durability in comparison to glass being significantly greater.

Several designs for various panels have been designed in the past. None of them, however, include a low-cost and aesthetically appealing panel for use in architectural structures and that is high wind resistant, high impact resistant, durable and provides insulation from the external environment.

Applicant believes that a related reference corresponds to European patent EP0340607 filed by Construction Specialties Inc. for a panel wall system. The Construction Specialties Inc. reference discloses a panel wall system that is composed of multiple rectangular panels arranged in a closely spaced relation in columns and rows. However, the panel wall system disclosed by Construction Specialties Inc. is complex and does not explicitly mention of aesthetic appeal at low cost.

Another related application is U.S. Pat. No. 8,484,931 filed by James Hardie Technology Ltd. for an external and internal wall fusing system. The James Hardie Technology Ltd. reference discloses a wall fusing and wall fusing system each comprising a plurality of panels. However, the James Hardie Technology Ltd. reference teaches of an embodiment requiring panels having a recess and hence makes it complex for manufacturing. Also, the wall fusing disclosed by James Hardie Technology Ltd. may not be aesthetically appealing at low cost along with resisting high wind pressure or impact.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a panel for architectural use that withstands high wind pressures as the panel has a high wind resistance.

It is another object of the present invention to provide a panel for architectural use that is high impact resistant and can be integrated with existing impact resistant window systems.

It is yet another object of the present invention to provide a panel for architectural use that protects the internal environment of the architecture from the external environment.

It is another object of the present invention to provide a panel for architectural usage that provides insulation to the interior to an architectural structure.

It is still another object of the present invention to provide a panel for architectural use that is aesthetically appealing at a low cost.

It is another object of the present invention to provide a panel for architectural use that is formed of an impact resistant interlayer, in melted form, that is fused in-between two porcelain panels, tiles or layers.

It is yet another object of the present invention to provide a panel for architectural use that is durable.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, FIGS. 1-9, where the present invention is generally referred to with numeral 10, it can be observed that a plurality of panels 10 are arranged to form an architectural structure or a portion of an architectural structure, in accordance with one embodiment. Each of panels 10 is formed through the assembly of a first rolled porcelain layer 20, an impact resistant interlayer 30 and a second rolled porcelain layer 40. The term "rolled" to describe first rolled and second rolled porcelain layers does not mean that those layers are in a rolled-up state. The term means that the porcelain panels have been manufactured using a roller mill.

Figure 1:
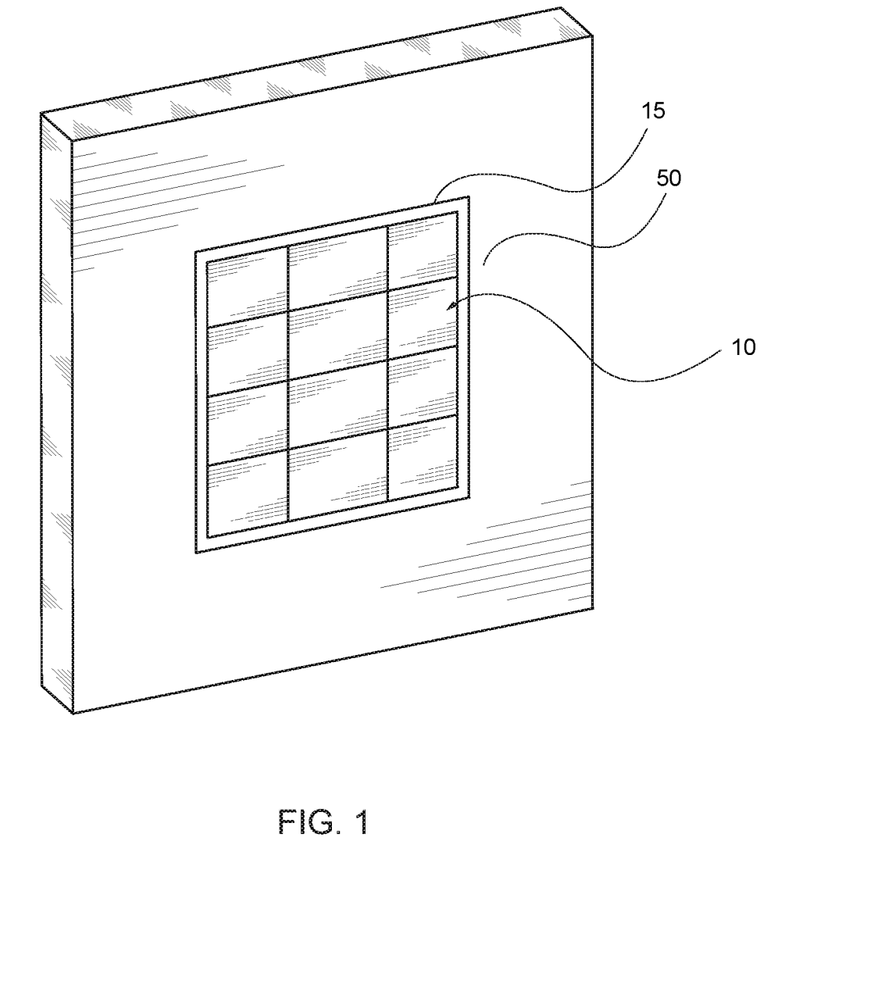
FIG. 1 represents a perspective view of the present invention in an operating environment showing an architectural structure having a portion of which is formed by the assembly of the panels which are formed by an impact resistant interlayer, in melted form, between two porcelain panels, tiles or layers.
Figure 2:
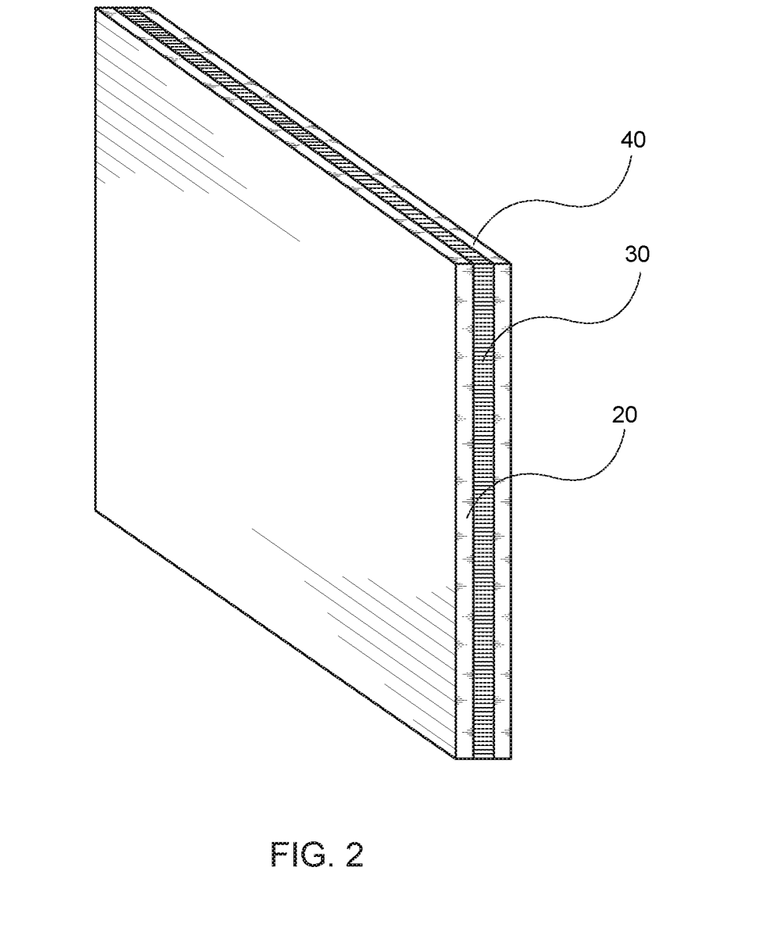
FIG. 2 demonstrates of perspective view of a typical panel showing an impact resistant interlayer fused therebetween two porcelains panels, tiles or layers.
Figure 3:
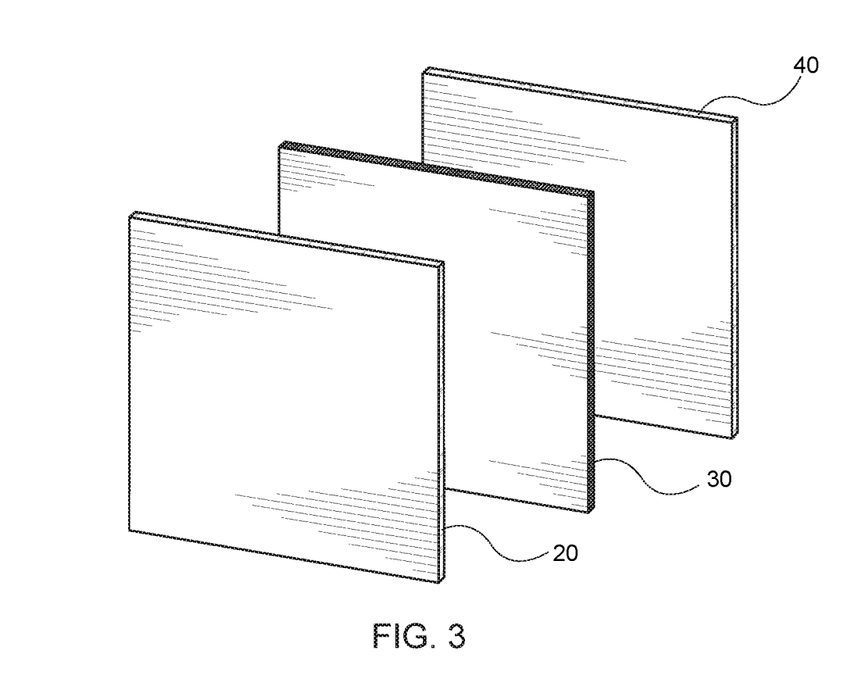
FIG. 3 shows an exploded view of a typical panel.
Figure 4:
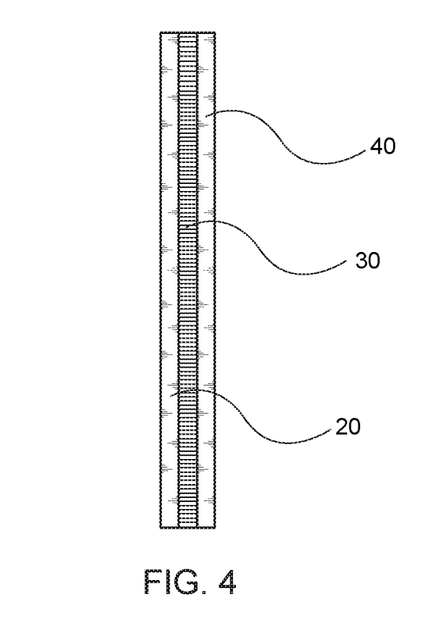
FIG. 4 is a side view of a typical panel.
Figure 5:
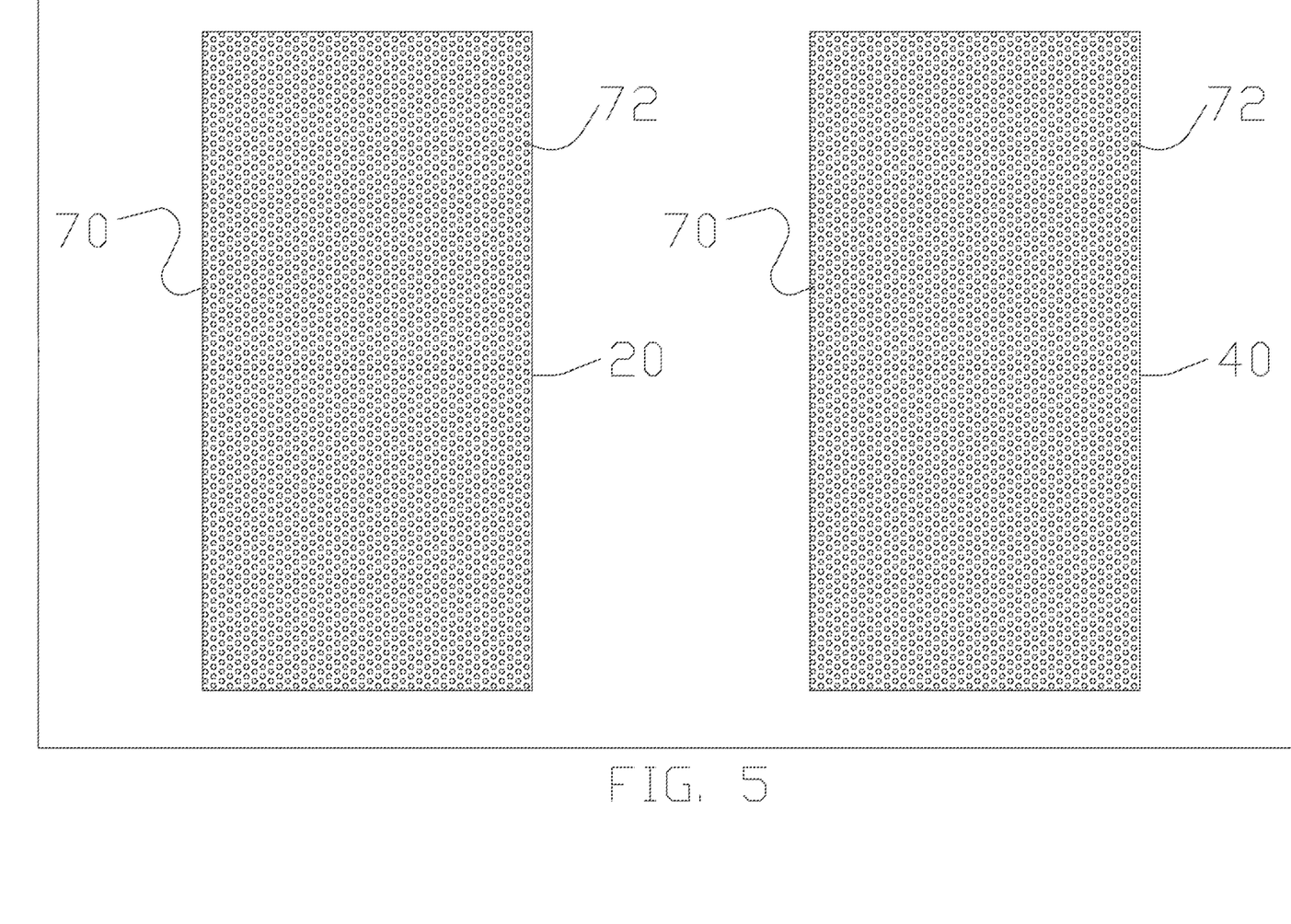
FIG. 5 is a top plan view of the inner surface of a porcelain layer of the present invention showing a plurality of pores therein.

As illustrated in FIG. 1, a number of panels 10 can be integrated into any system for a storefront, curtain wall, operable window, door, or railing. The present invention being a preassembled structural panel having an impact resistant panel assembly including first rolled porcelain layer 20, impact resistant interlayer 30 and second rolled porcelain layer 40. Conventional spandrel panels limit architects to particular colors and arrangements that can be configured onto a structure. The present invention provides a solution to these limitations placed upon architects by replacing the spandrel glass panel with an impact resistant porcelain panel that can come in various patterns and colors and resembles other building materials such as stone, wood or marble. Each of panels 10 is formed by the assembly of first rolled porcelain layer 20, an impact resistant interlayer 30 and second rolled porcelain layer 40. first rolled porcelain layer 20 and second rolled porcelain layer 40 are essentially porcelain tiles or panels that can be produced in various shapes, sizes, colors, and/or patterns. Use of porcelain tiles, like first rolled porcelain layer 20 and second rolled porcelain layer 40, provides the advantage of durability, longevity and an enhanced aesthetic look compared to conventional spandrel glass tiles.

The present invention is composed of porcelain panels which are much larger than conventional 24"×48" porcelain ties. Conventional porcelain tiles are currently made much smaller than the panels of the present invention because they warp or crack when fired in the oven to strengthen and/or crystallize the porcelain. The present invention is able to provide for porcelain layers or panels of a much larger size and thinner calibration because the porcelain layers of the present invention do not warp, crack, or break during baking. This is because the present invention uses a roller mill otherwise known as a roller press instead of a conventional hydraulic or pneumatic press that is used with conventional porcelain. In one embodiment, the roller mill/press that is used with the present invention can be between 40,000 and 50,000 pounds. The weight of the roller must be enough to roll out the air bubbles and water found in the porcelain but not enough weight to break or crack the material. This process is why the term "rolled" is used to describe the first and second rolled porcelain layers because they must be made using the process described herein.

Porcelain tiles, more specifically first rolled porcelain layer 20 and second rolled porcelain layer 40, can be decorated with various designs, line patterns, pictures and the like which makes porcelain tile more attractive and versatile than conventional means. With first rolled porcelain layer 20 and second rolled porcelain layer 40 there is no need to sacrifice design for function, instead both are achieved. first rolled porcelain layer 20 and second rolled porcelain layer 40 can be produced in various shapes and sizes. Use of porcelain tile, such as first rolled porcelain layer 20 and second rolled porcelain layer 40, also provides the advantage of being more impervious even when compared to tiles made of ceramics. This advantage can be extortionary when seeking the best protection from environmental elements that are often unpredictable and harsh.

Impact resistant interlayer 30 is an interlayer between first rolled porcelain layer 20 and second rolled porcelain layer 40. impact resistant interlayer 30 provides more overall strength and makes the present invention impact resistant. The strength of the present invention aids in reducing structural damage due to hazardous situations as a result of weather elements or other situations and circumstances beyond anyone's control. Impact resistant interlayer 30 is placed between first rolled porcelain layer 20 and second rolled porcelain layer 40 and fuses them together when melted. As impact resistant interlayer 30 is melted it seeps into the pores of each porcelain layer thereby creating a bond between all layers and creating one integral panel that can receive a blunt impact and not break off from a structure, thereby maintaining all the benefits of impact glass while providing the newly added benefits of giving an architect many more design options and design freedom. Impact resistant interlayer 30 can be polyvinyl butyral or ionomer each provide distinct characteristics and properties to the present invention.

Figure 6:
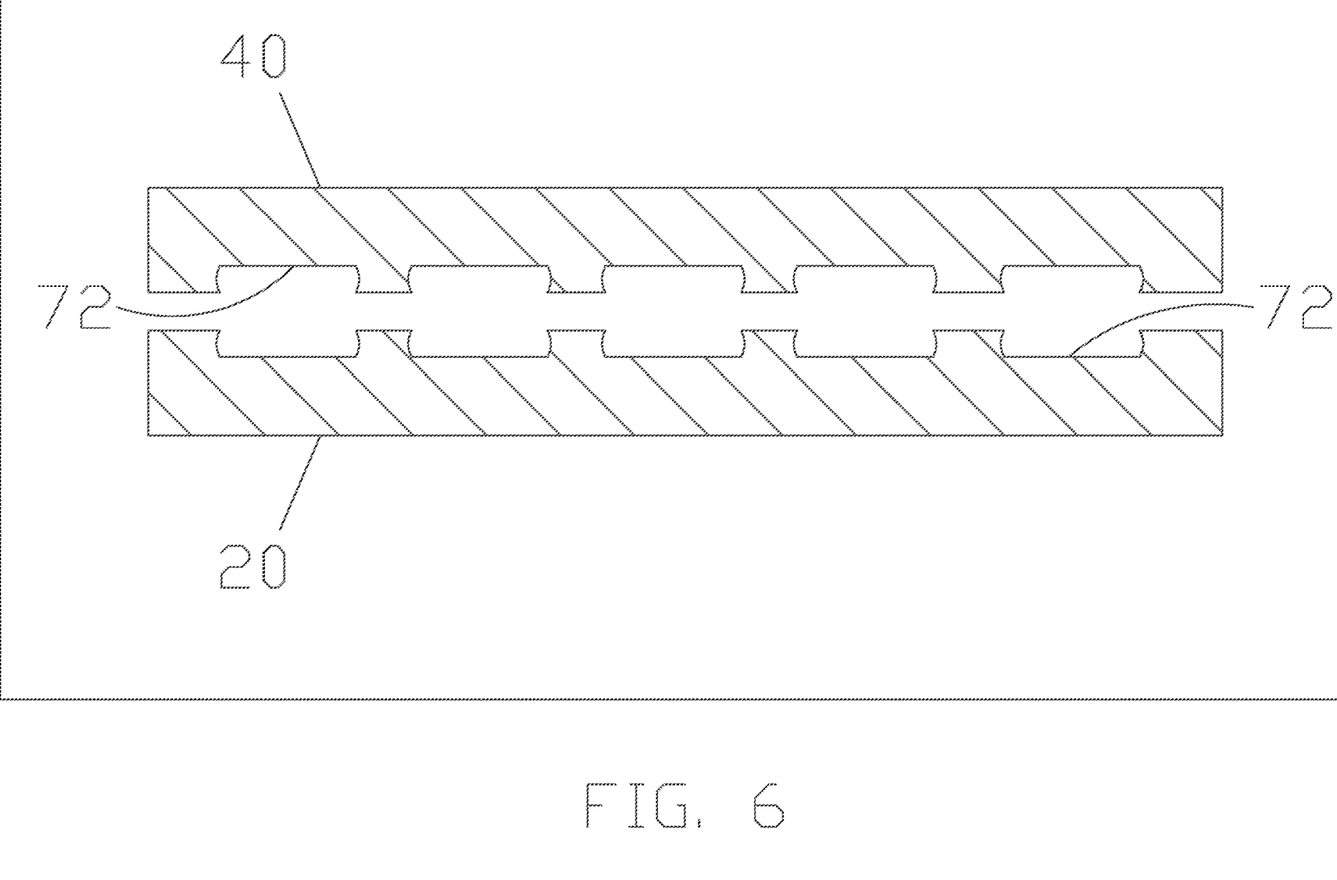
FIG. 6 is a cross sectional view of a porcelain layer of the present invention showing the depth of the plurality of pores located therein.
Figure 7:
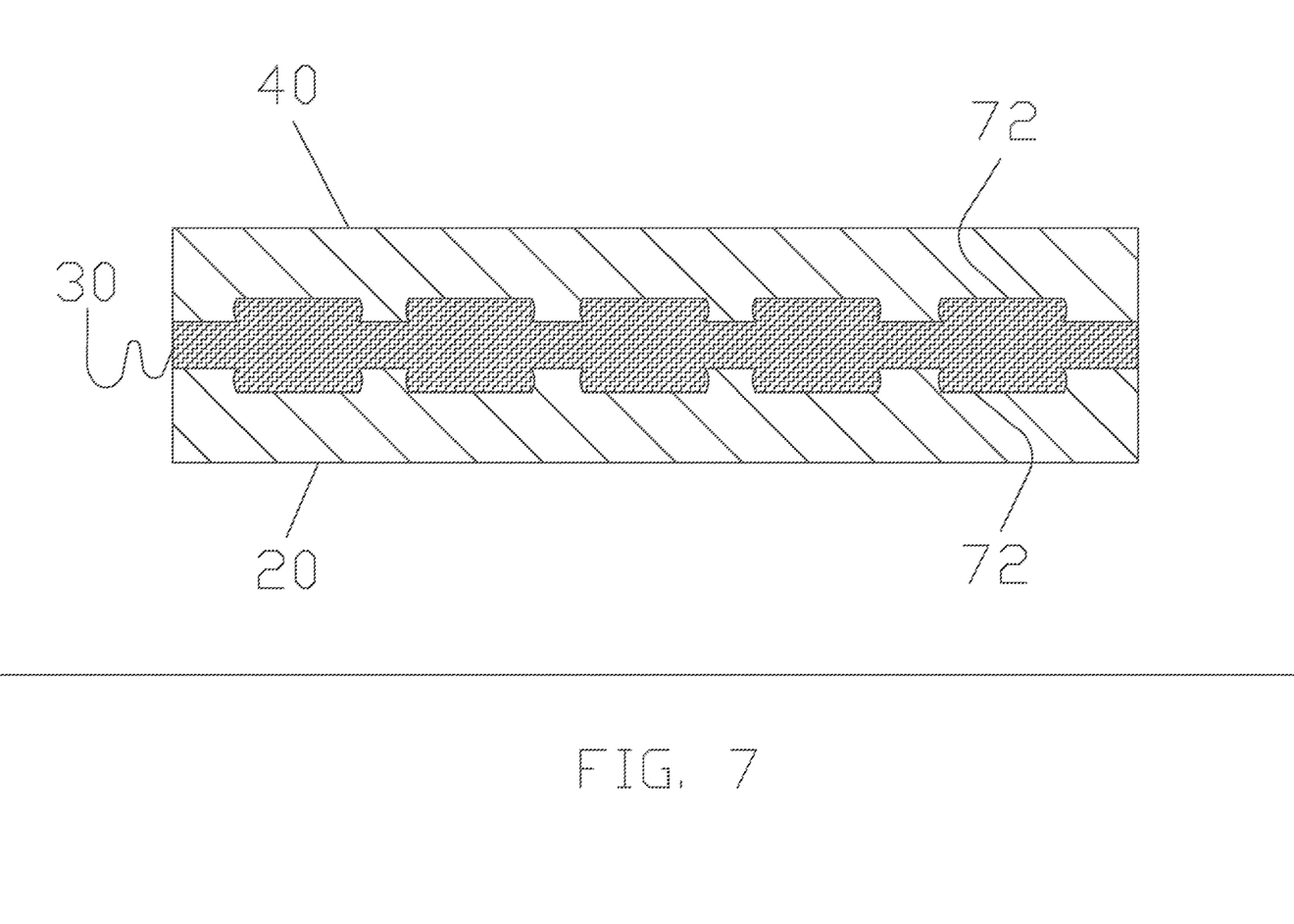
FIG. 7 is a cross sectional view of a porcelain layer of the present invention having the plurality of pores being filled by polyvinyl butyral (PVB) or similar material such as Ionomer.

As depicted in FIGS. 1-9, polyvinyl butyral or PVB interlayer 30 is to first rolled porcelain layer 20 and second rolled porcelain layer 40. Each of first rolled porcelain layer 20 and second rolled porcelain layer 40 may have an inner surface 70. Inner surface 70 may include a plurality of pores 72 as best shown in FIG. 6. Pores 72 may extend a predetermined depth into each of first rolled porcelain layer 20 and second rolled porcelain layer 40. Pores 72 are adapted to receive impact resistant interlayer 30 once it is melted. Preferably, impact resistant interlayer 30 may be melted and seeped into pores 72. As the melted impact resistant interlayer 30 cools in-between pores 72 of first rolled porcelain layer 20 and second rolled porcelain layer 40, first rolled porcelain layer 20 and second rolled porcelain layer 40 are fused together. Thereby resulting in the strong and durable panels that are panels 10.

In an alternate embodiment, there may be additional layers in-between first rolled porcelain layer 20 and second rolled porcelain layer 40. The use of the additional layers can be incorporated into the present invention. In an alternate embodiment, a bullet proof layer, having pores or cavities for impact resistant interlayer 30 to seep into when melted, can be used in panel 10 to achieve bulletproof properties for the present invention. Other additional layers may be suitable to similarly use as additional layers of the present invention.

In more detail, the process by which panel 10 is fused is as follows. First rolled porcelain layer 20 and second rolled porcelain layer 40 are washed and dried to remove any loose particles. Impact resistant interlayer 30 is placed on inner surface 70 of first rolled porcelain layer 20 with proper edging. Inner surface 70 of second rolled porcelain layer 40 is place atop of impact resistant interlayer 30. Once impact resistant interlayer 30 therebetween first rolled porcelain layer 20 and second rolled porcelain layer 40, the edges of first rolled porcelain layer 20 and second rolled porcelain layer 40 are sealed with high temperature tape to avoid leakage. Thereafter, first rolled porcelain layer 20, impact resistant interlayer 30 and second rolled porcelain layer 40 are placed in a vacuum bag. Negative air tubes are then used to suction all air from the vacuum bag to create an airtight seal. Next, all components, first rolled porcelain layer 20, impact resistant interlayer 30 and second rolled porcelain layer 40 while still in the vacuum bag, are placed on an autoclave rack which is then placed in an autoclave. The autoclave is then powered to fire up the components at the preprogrammed cycle for several hours. Temperatures in the autoclave may exceed 275 degrees Fahrenheit during the cycle. Once the cycle of the autoclave is complete, all components are retrieved and removed from the vacuum bag. At this point first rolled porcelain layer 20 and second rolled porcelain layer 40 have been fused together within the vacuum bag. The end result is panel 10 that has high wind and impact resistance and other previously mentioned benefits or characteristics. Panels 10 can be used for various architectural structure purposes that complement window systems to cover elements that should be concealed for aesthetic purposes.

Figure 8:
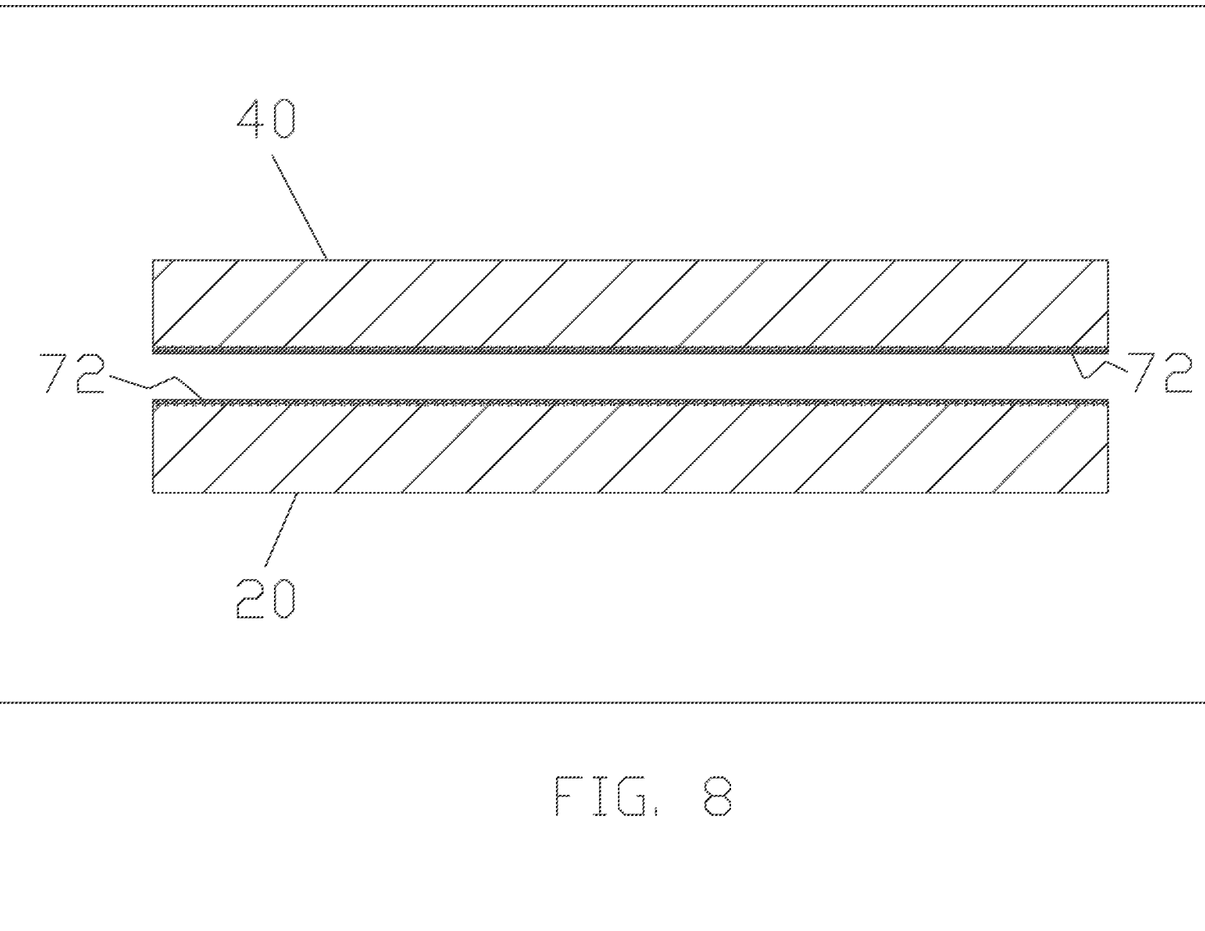
FIG. 8 is a cross sectional view of a porcelain layer showing the plurality of pores in an alternate embodiment.
Figure 9:
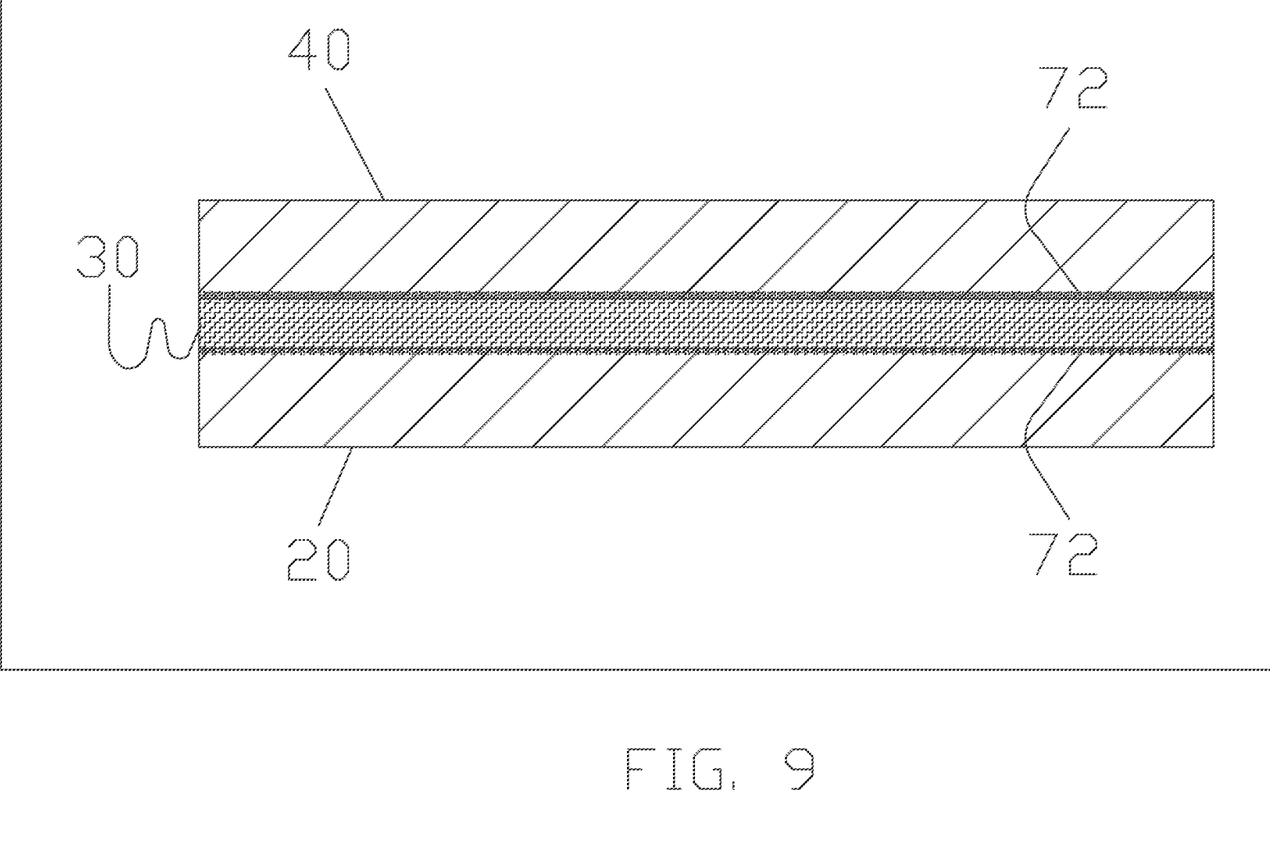
FIG. 9 is a cross sectional view of a porcelain layer having the pores in an alternate embodiment being filled by polyvinyl butyral (PVB) or similar material such as Ionomer.

In FIG. 8 and FIG. 9, pores 72 are shown in an alternate embodiment. Pores 72 instead do not extend as far into first rolled porcelain layer 20 or second rolled porcelain layer 40 in FIG. 8 and FIG. 9 as in the aforementioned FIG. 6 and FIG. 7. Pores 72 extend less into first rolled porcelain layer 20 and second rolled porcelain layer 40. Impact resistant interlayer 30 seeps into pores 72 once heated through the autoclave. Pores 72 may be a plurality of openings that allow for impact resistant interlayer 30 to seep into to fuse first rolled porcelain layer 20 and second rolled porcelain layer 40 to result in panels 10. There may be a substantial number of pores 72 being adjacent to one another to cover the entire inner surface 70 of first rolled porcelain layer 20 and second rolled porcelain layer 40. In one embodiment, pores 72 may be Z shaped or squiggled. Pores 72 may extend a predetermined depth into first rolled porcelain layer 20 and second rolled porcelain layer 40. More specifically, at inner surface 70 thereof.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A preassembled structural panel, comprising:
an impact resistant panel assembly including a first rolled porcelain layer, a second rolled porcelain layer, first and second rolled porcelain layers made using a roller press, an impact resistant interlayer fused between said first and second rolled porcelain layers, said first and second rolled porcelain layers having an inner surface including a plurality of pores therein, said impact resistant interlayer being melted to seep into said plurality of pores of said first and second rolled porcelain layers resulting in said first and second rolled porcelain layers being fused together by said impact resistant interlayer.

2. The panel of claim 1 wherein said impact resistant interlayer is polyvinyl butyral.

3. The panel of claim 1 wherein said impact resistant interlayer is ionomer.

4. The panel of claim 1 wherein said impact resistant interlayer is placed in solid form between said first and second rolled porcelain layers when said impact resistant interlayer is in an unmelted state and said impact resistant interlayer partially seeps into said pores in said melted state, thereby fusing said first and second rolled porcelain layers together.

5. The panel of claim 1 wherein said first rolled porcelain layer has a different design than said second rolled porcelain layer.

6. The panel of claim 1 wherein said first rolled porcelain layer has a different color than said second rolled porcelain layer.

7. The panel of claim 1 wherein said first rolled porcelain layer has an identical shape to said second rolled porcelain layer.

8. The panel of claim 1 wherein said first rolled porcelain layer and said second rolled porcelain layer are impervious.

9. The panel of claim 1 wherein said first and second rolled porcelain layers include a length and width, said impact resistant interlayer extends along entire said length and width in its premelted state.

10. The panel of claim 1, wherein said plurality of pores extend a predetermined depth into said first and second rolled porcelain layer.

* * * * *